Patented Aug. 14, 1951

2,564,035

UNITED STATES PATENT OFFICE 2,564,035

CATALYTIC DEHYDROHALOGENATION OF HALOGENATED SATURATED ACYCLIC ETHERS TO THE CORRESPONDING UNSATURATED ETHERS

Marius Séon, Montreuil-sous-Bois, and Isidor Raitzyn, Belloy, France, assignors to Pechiney—Compagnie de Produits Chimiques et Electrometallurgiques, a corporation of France No Drawing. Application June 1, 1949, Serial No. 96,623. In France June 15, 1948

5 Claims. (Cl. 260—614)

This invention relates to a method of catalytic dehydrohalogenation of halogenated organic compounds and to the products obtained by use of said method.

It is known that halogenated organic compounds may be stripped of a hydro-halic acid group from each molecule thereof by passing said compounds at a suitable temperature over suitable de-hydrohalogenation catalysts such as barium chloride.

This invention provides an improved method which makes use of unexpected catalytic properties displayed by barium sulfate toward halogen containing organic compounds, which properties differ from those exhibited by the barium salts such as the above-mentioned barium chloride previously used in the catalytic dehydrohalogenation of halogenated organic compounds. Thus, starting from mono- or polychlorinated etheroxides, the use of barium sulfate catalyst makes it possible to obtain unsaturated ether-oxides, whereas the employment of barium chloride further leads to a splitting of the ether-oxide function. It has thus been possible in accordance with the invention to prepare for the first time, to applicants' knowledge, various unsaturated ether-oxides which form valuable new products of manufacture.

For example, while chloro-isoamyl methyl ether is decomposed in the presence of barium chloride into isoprene, hydrochloric acid and methyl alcohol, the same ether when reacted over barium sulfate yields gamma-isoamylene-methyl ether (1-methoxy-3-methyl-butene-4), which is a novel result of undisputable commercial value.

A clear understanding of the invention will be derived from the ensuing illustrative examples.

Example 1

This example brings into clear light the differences in catalytic action between barium sulfate and the previously used barium chloride catalyst.

Chloro-isoamylmethyl ether is prepared by conventional methods, involving reacting chlorinated methyl oxide with isobutene. The resulting chloro-isoamylmethyl ether vapors are then passed through an oven heated at 310° C. over a catalyst comprising barium chloride deposited on a support such as silica. A reflux dephlegmator arranged as the outlet of the oven causes refluxing of the unconverted chloro-isoamylmethyl ether while permitting discharge of those of the reaction product fractions that have a boiling range under 100° C. at atmospheric pressure.

The reaction consists of a decomposition into isoprene, hydrochloric acid and methyl alcohol according to the equation:

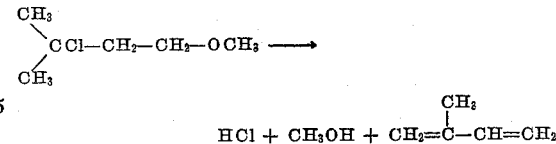

with a partial re-combining of the hydrochloric acid with the methyl alcohol into methyl chloride even when a vacuum of 100 mm. mercury is used as is generally the case.

If on the other hand according to the present invention the barium chloride catalyst in the above procedure is replaced with barium sulfate deposited on silica or employed in the absence of any support as in the form of small rods or cylinders, the operative procedure remaining in other respects unchanged, there is obtained a good yield of the gamma-isoamylene-methyl ether according to the equation:

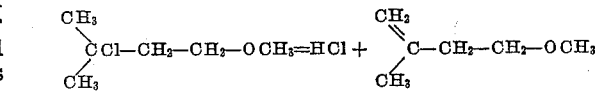

which is condensed. After rectification, the product is obtained in the form of a liquid boiling at 95° C. Specific gravity: 0.800 at 15° C. Iodine index: 254. Refractive index for the D-sodium line at 20° C.: $N_D^{20}=1.403$. The product is not soluble in water.

Its characteristics make it easily distinguishable over its isomer, gamma-gamma-dimethylallyl-methyl ether, a known compound.

Example 2

This example relates to de-hydrohalogenation of the chlorinated ether resulting from reaction of chlorinated methyl oxide with diisobutene in the presence of $ZnCl_2$.

The said chlorinated ether is prepared as follows: A molar quantity of diisobutene is poured into a glass bulb provided with an agitator and monochlorinated methyl oxide is added dropwise with external cooling to maintain a temperature of about 30-35° C. Zinc chloride $ZnCl_2$ is issued in an amount of from about 5 to 10%. At the end of about an hour during which agitation is maintained, it is found that the monochlorinated methyl oxide has become combined with the diisobutene.

The reaction product is washed with water to dissolve the catalyst and decompose any excess monochlorinated methyl oxide.

The reaction described above may be represented by the equation $$C_8H_{16} + C_2H_5OCl = C_{10}H_{21}OCl$$

The resulting chlorinated ether is passed through an oven heated at 500° C. and containing barium sulfate, the procedure being the same as described in the second part of Example 1 above. It is found that the ether is stripped of its hydrochloric acid in quantitative amount and is converted into the corresponding unsaturated ether $C_{10}H_{20}O$.

The above examples are in no wise restrictive. It is within the scope of the invention to operate under atmospheric pressure or under higher or lower pressures. Also the temperatures used may be varied within a wide range depending on the other operative conditions employed.

What we claim is:

1. A method for the dehydrohalogenation of a halogenated saturated acyclic ether to produce an unsaturated ether, which comprises passing the said halogenated saturated acyclic ether in the form of vapors over solid barium sulfate at a temperature not substantially less than 300° C.

2. A method according to claim 1, wherein the dehydrohalogenation takes place under a vacuum of about 100 mm. of mercury.

3. A method according to claim 1, wherein the unreacted halogenated saturated acyclic ether is separated from the more volatile unsaturated ether by condensation, and the former is recycled.

4. A method according to claim 1, wherein the barium sulfate is supported on silica.

5. A method according to claim 1, wherein the barium sulfate is in the form of small cylinders and is employed without a support.

MARIUS SÉON.
ISIDOR RAITZYN.

REFERENCES CITED

The following references are of record in the file of this patent:

UNITED STATES PATENTS

| Number | Name | Date |
| --- | --- | --- |
| 2,095,612 | Nutting et al. | Oct. 12, 1937 |
| 2,122,812 | Groll et al. | July 5, 1938 |
| 2,369,159 | Milas | Feb. 13, 1945 |